US008218044B2

(12) United States Patent
Sawada et al.

(10) Patent No.: US 8,218,044 B2
(45) Date of Patent: Jul. 10, 2012

(54) SOLID-STATE IMAGING DEVICE

(75) Inventors: Hirokazu Sawada, Tsuchiura (JP); Jose Tejada, Valencia (ES)

(73) Assignee: Texas Instruments Incorporated, Dallas, TX (US)

( * ) Notice: Subject to any disclaimer, the term of this patent is extended or adjusted under 35 U.S.C. 154(b) by 356 days.

(21) Appl. No.: 12/547,813

(22) Filed: Aug. 26, 2009

(65) Prior Publication Data

US 2010/0053392 A1    Mar. 4, 2010

(30) Foreign Application Priority Data

Aug. 26, 2008 (JP) ................................ 2008-217108

(51) Int. Cl.
*H04N 5/335* (2011.01)
(52) U.S. Cl. ........................................ 348/294; 348/300
(58) Field of Classification Search ........................ None
See application file for complete search history.

(56) References Cited

U.S. PATENT DOCUMENTS 7,969,476 B1 * 6/2011 Koifman .................... 348/222.1

* cited by examiner

*Primary Examiner* — David Ometz
*Assistant Examiner* — Angel L Garces-Rivera
(74) *Attorney, Agent, or Firm* — John J. Patti; Wade J. Brady, III; Frederick J. Telecky, Jr.

(57) ABSTRACT

The objective of this invention is to provide a solid-state imaging device and drive method with which sampling before the output values from pixels have reached a constant value can be avoided. The solid-state imaging device comprises photosensitive pixels arranged in the form of an array on a photosensitive surface and that have a photodiode that generates and stores a photocharge, a transfer transistor that transfers the photocharge, a floating diffusion to which the photocharge is transferred, and an amplifying transistor that converts the photocharge into a voltage signal and that amplifies the signal; photosensitive-surface output line connected to the source/drain of one of the amplifying transistors; power source connected thereto; sampling circuit connected to the photosensitive-surface output line; and current source regulating circuit, which regulates the current source current, connected to the current source so that, for sampling of the output values, the sampling circuit samples the output values after the output values have essentially become constant by comparing the output values immediately after they are output to the photosensitive-surface output lines.

19 Claims, 12 Drawing Sheets

SOLID-STATE IMAGING DEVICE

CROSS-REFERENCE RELATED APPLICATIONS

This patent application claims priority from Japanese Patent Application No. 2008-217108, filed 26 Aug. 2008 the entirety of which is incorporated herein by reference.

TECHNICAL FIELD

The present invention relates to a solid-state imaging device and, more particularly, to a CMOS imaging device.

BACKGROUND OF THE INVENTION

The demand for Complementary Metal-Oxide-Semiconductor (CMOS), Charge Coupled Device (CCD), and other image input image sensors has increased as their characteristics have improved. Turning to FIG. 18, a circuit diagram for one picture element (pixel) PX of a CMOS image sensor is shown. Each pixel comprises a photodiode PD that receives light and generates and stores a photocharge, a transfer transistor T that transfers the photocharge from photodiode PD, a floating diffusion FD to which the photocharge is transferred by means of transfer transistor T, a reset transistor RS that is connected to the floating diffusion FD for discharging the photocharge in floating diffusion FD, an amplifying transistor (source follower) SF that converts the photocharge in floating diffusion FD into a voltage signal and amplifies it and whose gate electrode is connected to floating diffusion FD, and a selection transistor X for selecting pixels, thereby constituting a so-called 4-transistor CMOS pixel sensor. The 4 transistors can each be an N-channel MOS transistor.

In a CMOS image sensor, multiple pixels that are configured as described above are arranged in the form of an array; in each pixel, drive lines φT and φR are respectively connected to the gate electrodes of transfer transistor T and reset transistor RS, and a pixel selection line SL (φx), which is driven from a row transistor, is connected to the gate electrode of selection transistor X. A prescribed supply voltage VR is applied to the source/drain (output side) of either reset transistor RS or selection transistor X, current source CS is connected to the source/drain (output side) of amplifying transistor SF and an output line $V_{OUT}$ that is controlled by a column shift register so that a voltage signal is output.

FIG. 19 is a circuit diagram showing the overall circuit configuration of the CMOS image sensor. Multiple pixels are arranged in the form of an array on the photosensitive surface. The figure shows four pixels (PX1-PX4) as a representative example; the set of pixels in this configuration is repeated in the row and column directions. Connected to each pixel PX are supply voltage VR, ground GND, and drive lines (φT, φR, φx) that are controlled by a row shift register $SR^V$. Each pixel is controlled by a column shift register $SR^H$ and drive lines (φNS, φN). As explained below, a charge signal (S)+CFD noise (N) and a CFD noise (N) signal are output from each pixel to each output line at their respective timing through an analog memory AM that that can be cleared by drive line φXCLR.

FIG. 20 is a circuit diagram analogous to the output portion of each pixel of the CMOS image sensor. The source/drain (output side) of the amplifying transistor SF comprising each pixel is connected to a constant current source (called current source hereafter) CS. When Vin is input from the floating diffusion to the gate of amplifying transistor SF, current $I_{CS}$ corresponding to the output voltage from output line $V_{OUT}$ flows to current source CS. The output line $V_{OUT}$ is connected to an analog memory capacitor CAM via a switch SW, so that when switch SW is closed, a charge corresponding to the output voltage is stored in analog memory capacitor CAM. Parasitic capacitance $C_{LINE}$ is also present in output line $V_{OUT}$, giving total capacitance $C_{TOTAL}$=CAM+$C_{LINE}$. In the circuit shown in FIG. 20, output voltage $V_{OUT}$ is represented by equation (1) below as a function of current I.

$$V_{OUT} = V_{IN} - V_{TH}(V_{OUT}) - \sqrt{\frac{2I}{\mu_n C_{ox}} \cdot \frac{L}{W}} \quad (1)$$

The lower limit of output voltage is determined at the point where the current source transistor barely operates in the saturation region, and the output voltage range decreases in proportion to the square root of the current. The power consumption increases with current.

FIG. 21 illustrates the equation (1) in the form of a graph showing the output voltage to output line $V_{OUT}$ versus the input voltage $V_{IN}$. The broken line is a straight line, with $V_{IN}=V_{OUT}$. Output voltage $V_{OUT}$ falls by $\Delta V$ relative to input voltage $V_{IN}$, and $\Delta V$ is proportional to $\sqrt{I}$, as shown by equation (1). At the same time, the value of output voltage $V_{OUT}$ varies from the output start time, and the time required until output voltage $V_{OUT}$ stabilizes is represented by equation (2) below.

$$t = \frac{(V_{DARK} - (V_{IN} - V_{TH}))C_{TOTAL}}{I_{CS}} + \frac{2C_{TOTAL}}{\sqrt{\frac{2I}{\mu_n C_{ox}} \cdot \frac{W}{L}I_{CS}}} \quad (2)$$

Here, $V_{DARK}$ is the vertical signal line and analog memory reset voltage, and $C_{TOTAL}$ is $C_{TOTAL}$=CAM+$C_{LINE}$, as described above. To calculate speed, switch SW is closed, and the discharge speed of the charge stored in the two capacitors above is calculated. From Equation (2), the time required for output will be faster the larger the current $I_{CS}$ of bias current source CS.

FIG. 22 illustrates the equation (2) in the form of a graph showing the change in output voltage of output line $V_{OUT}$ versus time for three different magnitudes of current $I_{CS}$ lowing through current source CS (when current $I_{CS}$ is a small value (a), an intermediate value (b) and a large value (c)). Voltage at time 0 is voltage $V_{DARK}$ that corresponds to the output when there is no input voltage, that is, a dark signal; the larger the current $I_{CS}$, the lower the voltage $V_{DARK}$, and the smaller the current $I_{CS}$, the higher the voltage $V_{DARK}$. The output voltage of output line $V_{OUT}$ drops with time from voltage $V_{DARK}$ at time 0 and reaches a constant value at a certain voltage. As current $I_{CS}$ increases, $V_{DARK}$ and the output voltage of output line $V_{OUT}$ at the constant value decreases, and as current $I_{CS}$ decreases, $V_{DARK}$ and the voltage increase, like the magnitude of voltage $V_{DARK}$ at time 0. The time until a constant voltage value is reached from voltage $V_{DARK}$ at time 0 described above varies depending upon the magnitude of current $I_{CS}$; thus, the time until a constant value is reached increases as the current $I_{CS}$ decreases. As is clear from equations (1) and (2), the source follower output voltage range or power consumption and speed are in a trade-off relationship, relative to the bias current source.

There is, therefore, a need for a circuit that addresses the concern the fact that the magnitude of the current of the current source varies during the sampling of the output voltage from the pixels, and that sampling may occur before the output value from the pixels has reached a constant value.

SUMMARY OF THE INVENTION

The solid-state imaging device of the present invention comprises photosensitive-surface pixels that are arranged in the form of an array on a photosensitive surface and that have a photodiode that receives light and generates and stores a photocharge, a transfer transistor that transfers the photocharge from the photodiode, a floating diffusion to which the photocharge is transferred by means of the transfer transistor, and an amplifying transistor that converts the photocharge in the floating diffusion to a voltage signal and amplifies the signal and whose gate electrode is formed connected to the floating diffusion; photosensitive-surface output lines that are connected to the photosensitive-surface pixels in the source/drain of each of the amplifying transistors that comprise the photosensitive-surface pixels; a sampling circuit that is connected to the photosensitive-surface output lines that samples the output values from the photosensitive-surface output lines; a current source formed for the photosensitive-surface output lines; and a current source regulating circuit that is formed so that it is connected to the current source and that regulates the current of the current source, so that during sampling of the output values, the sampling circuit samples the output values after the output values have essentially been held constant by comparing the output values immediately after they are output to the photosensitive-surface output lines.

The solid-state imaging device of the present invention comprises photosensitive-surface pixels that are arranged in the form of an array on a photosensitive surface and that have a photodiode that receives light and generates and stores a photocharge, a transfer transistor that transfers the photocharge from the photodiode, a floating diffusion to which the photocharge is transferred via the transfer transistor, and an amplifying transistor that converts the photocharge in the floating diffusion into a voltage signal and amplifies the signal, and whose gate electrode is formed connected to the floating diffusion.

In addition, photosensitive-surface output lines are connected to the photosensitive-surface pixels in the source/drain of each of the amplifying transistors that comprises the photosensitive-surface pixels.

A current source is also formed for the photosensitive-surface output lines, and the sampling circuit that samples the output values of the photosensitive-surface output lines is connected to the photosensitive-surface output lines.

Here, a current source regulating circuit is formed so that it is connected to the current source. The current source regulating circuit regulates the current source current so that, for the sampling of output values, the sampling circuit samples output values after the output values have essentially become constant by comparing them immediately after output to the photosensitive-surface pixels.

With the solid-state imaging device of the present invention, preferably, the photosensitive-surface output lines are formed for each column of the photosensitive-surface pixels, the current source is formed for each of the photosensitive-surface output lines, and the current source regulating circuit regulates the current of a plurality of the current sources.

With the solid-state imaging device of the present invention, preferably, the current source regulating circuit also has reference pixels arranged outside or inside of the photosensitive surface, reference output lines connected to the reference pixels and the current source regulating part, and a feedback circuit that feeds back the reference output from the reference output lines to the current source in accordance with the reference output in order to regulate the current.

In the solid-state imaging device of the present invention, also, preferably, the reference pixels and the reference output lines are formed outside the photosensitive surface.

Or, also preferably, some of the photosensitive pixels that comprise the photosensitive surface are selected and used as the reference pixels, and the photosensitive-surface output lines connected to the photosensitive pixels used as the reference pixels are used as the reference output lines.

The reference pixels of the solid-state imaging device of the present invention preferably comprise columns consisting of a plurality of reference pixels.

With the solid-state imaging device of the present invention, preferably, the feedback circuit also includes a reference output sampling circuit that is connected to the reference output lines that samples the reference output and feeds back the reference output obtained by the reference output sampling circuit to the current source in accordance with the reference output.

Also, the solid-state imaging device drive method of the present invention for the solid-state imaging device that comprises photosensitive-surface pixels that are arranged in the form of an array on a photosensitive surface and that have a photodiode that receives light and generates and stores a photocharge, a transfer transistor that transfers the photocharge from the photodiode, a floating diffusion to which the photocharge is transferred via the photodiode, and an amplifying transistor that converts the photocharge in the floating diffusion into a voltage signal and amplifies the signal and whose gate electrode is formed so that it is connected to the floating diffusion; photosensitive-surface output lines that are connected to the photosensitive-surface pixels in the source/drain of each of the amplifying transistors that comprise the photosensitive-surface pixels; a current source formed for the photosensitive-surface output lines; and a sampling circuit that is connected to the photosensitive-surface output lines that samples the output values of the photosensitive-surface output lines, includes a process to regulate the current of the current source so that when the output values are sampled, the sampling circuit samples the output values after the output values have essentially reached a fixed value, by comparing the output values immediately after they are output to the photosensitive-surface output lines.

In the solid-state imaging device drive method of the present invention for a solid-state imaging device that comprises photosensitive-surface pixels that are arranged in the form of an array on a photosensitive surface and that have a photodiode that receives light and generates and stores a photocharge, a transfer transistor that transfers the photocharge from the photodiode, a floating diffusion to which the photocharge is transferred via the photodiode, and an amplifying transistor that converts the photocharge in the floating diffusion into a voltage signal and amplifies the signal, and whose gate electrode is formed so that it is connected to the floating diffusion; photosensitive-surface output lines are connected to the photosensitive-surface pixels in the source/drain of each of the amplifying transistors that comprise the photosensitive-surface pixels; a current source formed for the photosensitive-surface output lines; and a sampling circuit that samples the output values of the photosensitive-surface pixels is connected to the photosensitive-surface output lines; the current of the current source is regulated so that the sampling circuit samples the output values after the output values have essentially reached a fixed value, by comparing the output values immediately after they are output to the photosensitive-surface output lines.

The solid-state imaging device used with the solid-state imaging device drive method of the present invention preferably also comprises reference pixels provided outside or inside of the photosensitive surface, and reference output lines connected to the reference pixels and the current source regulating part, so that during the process of regulating the current of the current source, the reference output from the reference output lines is fed back to the current source in accordance with the reference output in order to regulate the current.

In the solid-state imaging device used with the solid-state imaging device drive method of the present invention, preferably the reference pixels and the reference output lines are formed outside of the photosensitive surface.

In the solid-state imaging device used with the solid-state imaging device drive method of the present invention, preferably some of the photosensitive pixels that comprise the photosensitive surface are selected and used as the reference pixels, and the photosensitive-surface output lines connected to the photosensitive pixels used as the reference pixels are used as the reference output lines.

The CMOS type solid-state imaging device of the present invention comprise multiple light-receiving elements arranged in the form of a matrix, each of which comprises an output transistor, multiple read lines corresponding to each column of the light-receiving elements and each of which is connected to the output transistors for reading the output signals from the light-receiving elements for each row, multiple current source circuits, each of which is connected to the multiple read lines, for supplying current to the output transistors; multiple sampling circuits, each of which is connected to the multiple read lines, for sampling an output signal of the light-receiving elements; and a control circuit that is connected to the read lines, which detects the output signals of the light-receiving elements connected to the read lines, and that controls the current supplied to the output transistors by the current source circuits according to the output results, wherein it controls the current supplied from the multiple current source circuits so that the output signals appearing on the read lines will essentially be held constant when sampling of the output signals from the light-receiving elements by the sampling circuits is completed.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 12 (B) shows the temporal change in the bright signal when light is applied;

FIG. 12 (C) shows the temporal change in $V_{DIFFOUT}$;

FIG. 12 (D) shows the temporal change in $I_{CS}$;

FIG. 12 (E) shows the temporal change in $V_{BIAS}$;

FIGS. 13 (C) and (D) are the dark signal and the bright signal when current begins to flow;

FIGS. 13 (E) and (F) are the dark signal and the bright signal when current is stable;

DETAILED DESCRIPTION

Figure 1:
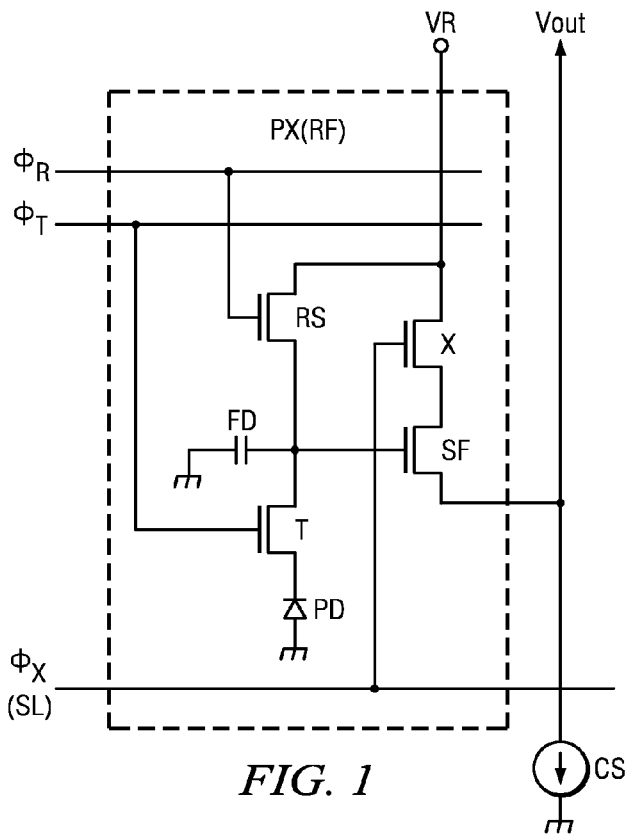
FIG. 1 is a circuit diagram of one photosensitive-surface picture element (pixel) PX constituting a CMOS image sensor photosensitive surface in accordance with a preferred embodiment of the present invention.

Refer now to the drawings wherein depicted elements are, for the sake of clarity, not necessarily shown to scale and wherein like or similar elements are designated by the same reference numeral through the several views.

With the solid-state imaging device of the present invention, when the output values (or output signals) are sampled under the control of the current source regulating circuit (or the control circuit), the sampling circuit can sample the output values after the output values have been held essentially constant by comparing the output values immediately after they are output to the photosensitive-surface output lines (or read lines), so that sampling is not performed before the output values from the pixels reach a constant value.

With the solid-state imaging device drive method of the present invention, when the output values are sampled, the sampling circuit can sample the output values after the output values have been held essentially constant by comparing the output values immediately after they are output to the photosensitive-surface output lines, so that sampling is not performed the output values from the pixels reach a constant value.

The solid-state imaging device in accordance with a preferred embodiment of the present invention is a CMOS image sensor. FIG. 1 is a circuit diagram of a photosensitive-surface picture element (pixel) PX that forms a CMOS image sensor photosensitive surface in accordance with a preferred embodiment of the present invention. Each photosensitive-surface pixel comprises a photodiode PD that receives light and generates and stores a photocharge, a transfer transistor T that transfers the photocharge from photodiode PD, a floating diffusion FD to which the photocharge is transferred via transfer transistor T, a reset transistor RS that is formed so that it is connected to the floating diffusion FD for discharging the photocharge in floating diffusion FD, an amplifying transistor (source follower) SF that converts the photocharge in floating diffusion FD into a voltage signal and that amplifies the signal, and whose gate electrode is formed connected to floating diffusion FD, and a selection transistor X for selecting pixels, thereby constituting a so-called 4-transistor CMOS image sensor. The four transistors can each be an N-channel MOS transistor for example.

In the CMOS image sensor, a plurality of photosensitive-surface pixels PX with the constitution described above is arranged in the form of an array. In each photosensitive-surface pixel PX, drive lines φT and φR are respectively connected to the transfer transistor T and reset transistor RS gate electrode, and pixel selection line SL (φx) driven from a row shift register is connected to the gate electrode of selection transistor X. A prescribed supply voltage VR is applied to the source/drain (output side) of either reset transistor RS or selection transistor X, current source CS is connected to the source/drain (output side) of amplifying transistor SF and an output line $V_{OUT}$ that is controlled by a column shift register so that a voltage signal is output. Selection transistor X and drive lines φx can be omitted, since the voltage of floating diffusion FD can be fixed to an appropriate value so that pixels can be selected or not selected. Selection transistor X can also be placed between amplifying transistor SF and output line $V_{OUT}$.

Figure 2:
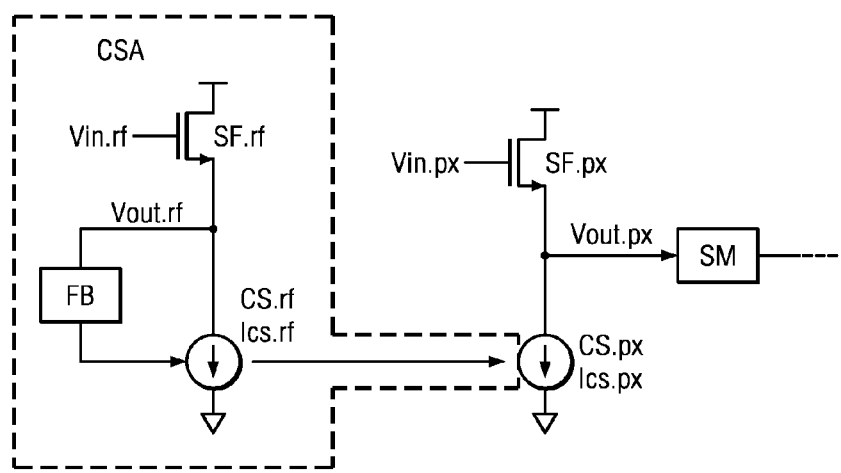
FIG. 2 is a circuit block diagram showing the conceptual configuration of the CMOS image sensor in accordance with a preferred embodiment of the present invention.

FIG. 2 is a circuit block diagram showing the conceptual configuration of the CMOS image sensor in accordance with a preferred embodiment of the present invention. Photosensitive-surface output line Vout.px is connected to photosensitive-surface pixels PX at the source/drain of one amplifying transistor SF.px which constitutes photosensitive-surface pixel PX. A current source CS.px is also formed for photosensitive-surface output line Vout.px. A sampling circuit SM that is connected to photosensitive-surface pixel Vout.px and that samples the output value of photosensitive-surface output line Vout.px is also formed. Depending on the input Vin.px to the gate of amplifying transistor SF.px, current Ics.px flows to current source CS.px, and an output signal is output to photosensitive-surface output line Vout.px. Sampling circuit SM receives the output signal of the photosensitive-surface output line Vout.px. The output of sampling circuit SM is connected to a signal processing circuit, not shown, and the signal acquired as described above undergoes signal processing. Output signal sampling is performed during the horizontal blanking period, and the sampling time can be set to the maximum value allowed during the horizontal blanking period. The CMOS image sensor in accordance with a preferred embodiment of the present invention is connected to current source CS.px, which is controlled by current source regulating circuit CSA. Current source regulating circuit CSA regulates the current of current source CS.px so that, when sampling circuit SM samples the output value of photosensitive-surface pixel Vout.px, sampling circuit SM samples the output value after the output value has become essentially constant, by comparison to photosensitive-surface output line Vout.px immediately after output. The current source regulating circuit CSA has reference pixels RF outside or inside the photosensitive surface, for example. Reference pixel RF has the same configuration as the photosensitive-surface pixel PX shown in FIG. 1, for example, and is configured to operate in the same way as above-mentioned photosensitive-surface pixel PX.

FIG. 2 shows also amplifying transistor SF.rf, which constitutes a reference pixel RF. Current source regulating circuit CSA has a reference output line Vout.rf connected to amplifying transistor SF.rf. Current source CS.rf is connected to reference output line Vout.rf. Current source regulating circuit CSA also has a feedback circuit FB that references the reference output from reference output line Vout.rf, which is fed back to the current source to regulate the current of current source CS.px. Current Ics.rf flows to current source CS.rf, and depending on input Vin.rf to the gate of amplifying transistor SF.rf of reference pixel RF, an output signal is output to reference output line Vout.rf. Feedback circuit FB references the reference output from reference output line Vout.rf, which is fed back to the current source to regulate current source CS.px. As described above, feedback circuit FB first feeds back the reference output to current source CS.rf of reference output line Vout.rf, the resulting current Ics.rf is copied and fed back to current source CS.px.

The reference pixels RF and photosensitive-surface pixels PX preferably have the same configuration as described above, and in particular, the amplifying transistors (SF.rf, SF.px) also preferably have the same characteristics. Photosensitive-surface pixels PX are also not limited to active pixels which are enabled to generate image data, but could also include dummy pixels. The feedback circuit FB, for example, is connected to reference output line Vout.rf, and includes reference sampling output to sample the reference output. Feedback to the current source is provided according to the reference output obtained by the reference output sampling part.

Figure 3:
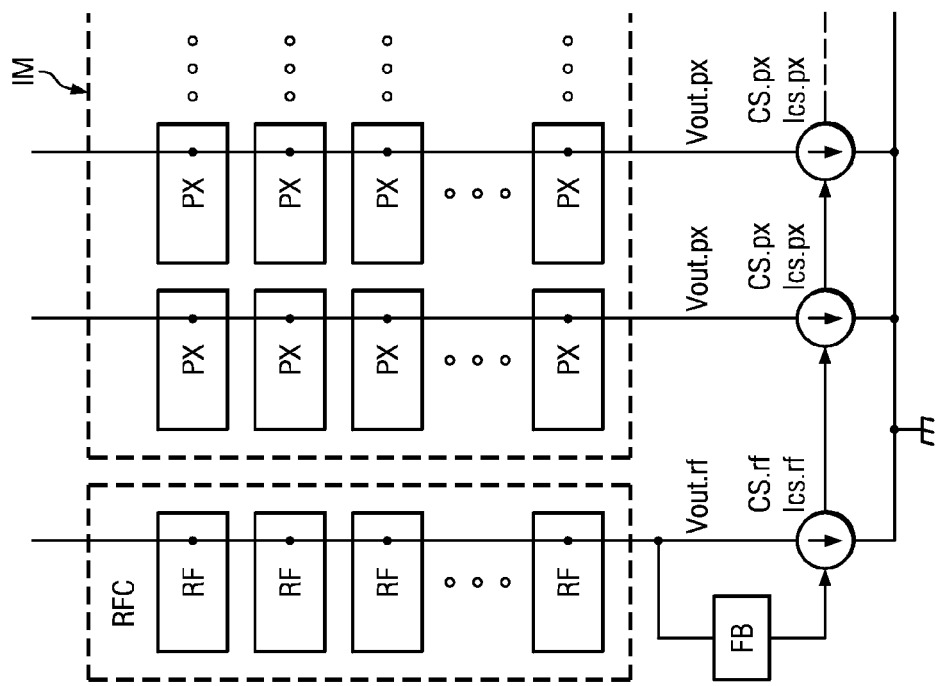
FIG. 3 is an enlarged circuit block diagram of the photosensitive surface and the current regulating circuit of the CMOS image sensor in accordance with a preferred embodiment of the present invention.

FIG. 3 is an enlarged circuit block diagram of the photosensitive surface and the current regulating circuit of the CMOS image sensor in accordance with a preferred embodiment of the present invention. Photosensitive-surface pixels PX are arranged in the form of an array on photosensitive surface IM, and for example, a photosensitive-surface output Vout.px is formed for each column of photosensitive-surface pixels PX, and a current source CS.px is formed for each photosensitive-surface output line Vout.px. At the same time, reference pixel RF and reference output line Vout.rf, which constitute the current regulating part, are formed outside of photosensitive surface IM. There are multiple reference pixels RF, which constitute columns RFC, as reference pixels RF. Feedback circuit FB is connected to reference output line Vout.rf to regulate the current of current source CS.rf of reference output line Vout.rf. In the configuration, feedback circuit FB references reference data from the multiple reference pixels RF constituting column RFC, which is fed back to current source CS.rf of reference output line Vout.rf, and the resulting current Ics.rf is copied and fed back to multiple current sources CS.px, so that current Ics.px is regulated.

Figure 4:
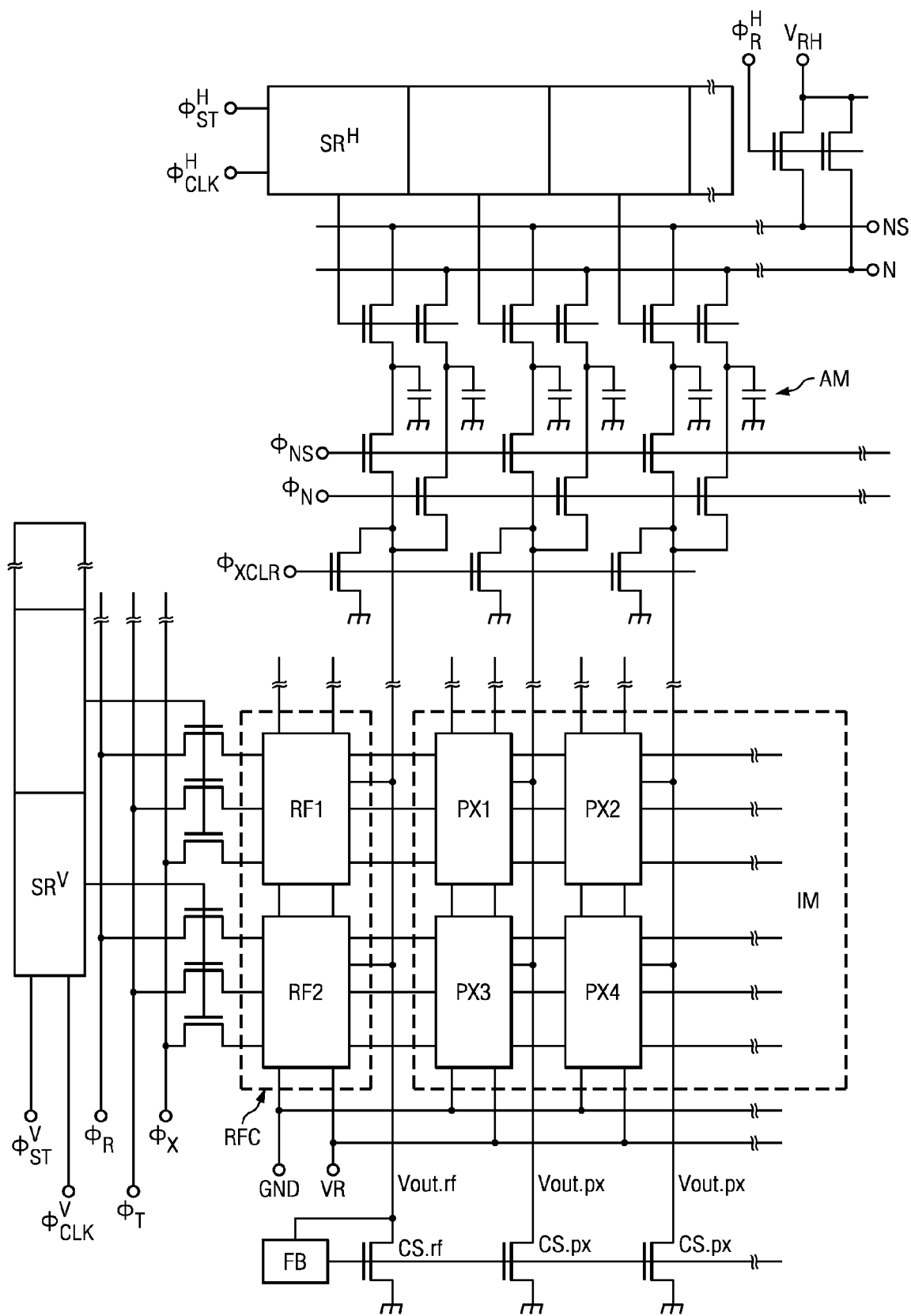
FIG. 4 is a circuit diagram showing the overall circuit configuration of the CMOS image sensor with the configuration shown in FIG. 3.

FIG. 4 is a circuit diagram showing the overall circuit configuration of the CMOS image sensor with the configuration shown in FIG. 3. Multiple photosensitive-surface pixels PX are arranged in the form of an array on photosensitive surface IM. In the figure, four representative photosensitive-surface pixels (PX1-PX4) are shown, and the set of photosensitive-surface pixels in this configuration is repeated in row direction and the column direction. Supply voltage VR, ground GND, and drive lines ($\phi$T, $\phi$R, $\phi$x) that are controlled by a row shift register SRV are connected to each pixel PX. Each pixel is controlled by column shift register SRH and drive lines ($\phi$NS, $\phi$N) and, as described below, a signal N-S (reference to as signal FNS hereafter) is the difference between charge signal (S) and CFD noise (N), and CFD noise (N) (signal N hereafter) are output from each pixel via an analog memory AM, which can be cleared by drive line $\phi$XCLR. The pixels which are arranged in the form of an array in the photosensitive-surface as described above generate an analog signal (signal NS) according to the amount of light received. Signal N, which is noise, is also generated. The difference is found and a signal S is calculated from the signal N and signal NS. Subsequent signal processing is the same as in a conventional CMOS image sensor.

In the CMOS image sensor in accordance with a preferred embodiment of the present invention, a reference pixel column RFC, which contains two representative reference pixels (RF1, RF2), is provided in proximity to the outside of photosensitive surface IM, a reference output line Vout.rf is formed so as to be connected to it, a transistor that acts as current source CS.rf is formed, and feedback circuit FB is provided to feed back the output from reference output line Vout.rf. The configuration is such that the output of feedback circuit FB is also connected to transistors that act as current sources CS.px of photosensitive-surface output lines Vout.px connected to 4 photosensitive-surface pixels in order to regulate the current. The figure shows a configuration in which feedback circuit FB is connected to a location in column RFC of reference pixel RF that is farthest from current source CS.rf, but the configuration could also be such that it is connected to a location between the gate ($\phi$NS, $\phi$N) and analog memory AM in order to send pixel data to analog memory AM. To provide reference data, reference pixels RF supply a reference pixel NS signal, and in particular, a saturated signal, for example.

Figure 5:
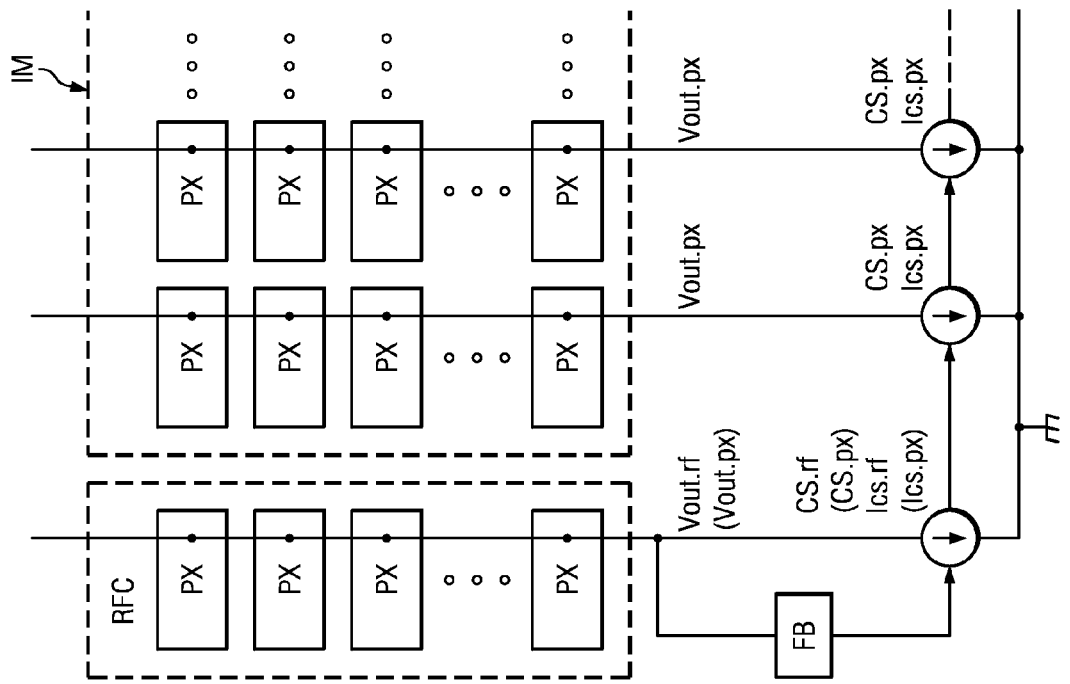
FIG. 5 is an enlarged circuit block diagram of the photosensitive surface and the current regulating circuit of the CMOS image sensor in accordance with a preferred embodiment of the present invention.

FIG. 5 is a circuit block diagram in which the photosensitive surface and current regulating circuit of the CMOS image sensor in accordance with a preferred embodiment of the present invention, which has a different configuration than that of FIGS. 3 and 4, are enlarged. In the configuration shown in FIG. 5, photosensitive-surface pixels PX are arranged in the form of an array on photosensitive surface IM, and, for example, a photosensitive-surface output line Vout.px is formed for each column of photosensitive-surface pixels PX, and a current source CS.px is formed for each photosensitive-surface output line Vout.px. Here, some of the photosensitive-surface pixels PX that constitute photosensitive surface IM are selected and used as reference pixels RF, and constitute column RFC of reference pixels RF. Photosensitive-surface output lines Vout.px connected to the photosensitive-surface pixels PX used as reference pixels RF are also used as reference output lines Vout.rf. Feedback circuit FB is connected to reference output lines Vout.rf to regulate the current of current sources CS.rf of reference output lines Vout.rf. In this configuration, feedback circuit FB references reference data from multiple reference pixels RF that constitute column RFC, which is fed back to current sources CS.rf of reference output lines Vout.rf, copies the resulting current Ics.rf and feeds back the data to the other multiple current sources CS.px, so that currents Ics.px are regulated.

Figure 6:
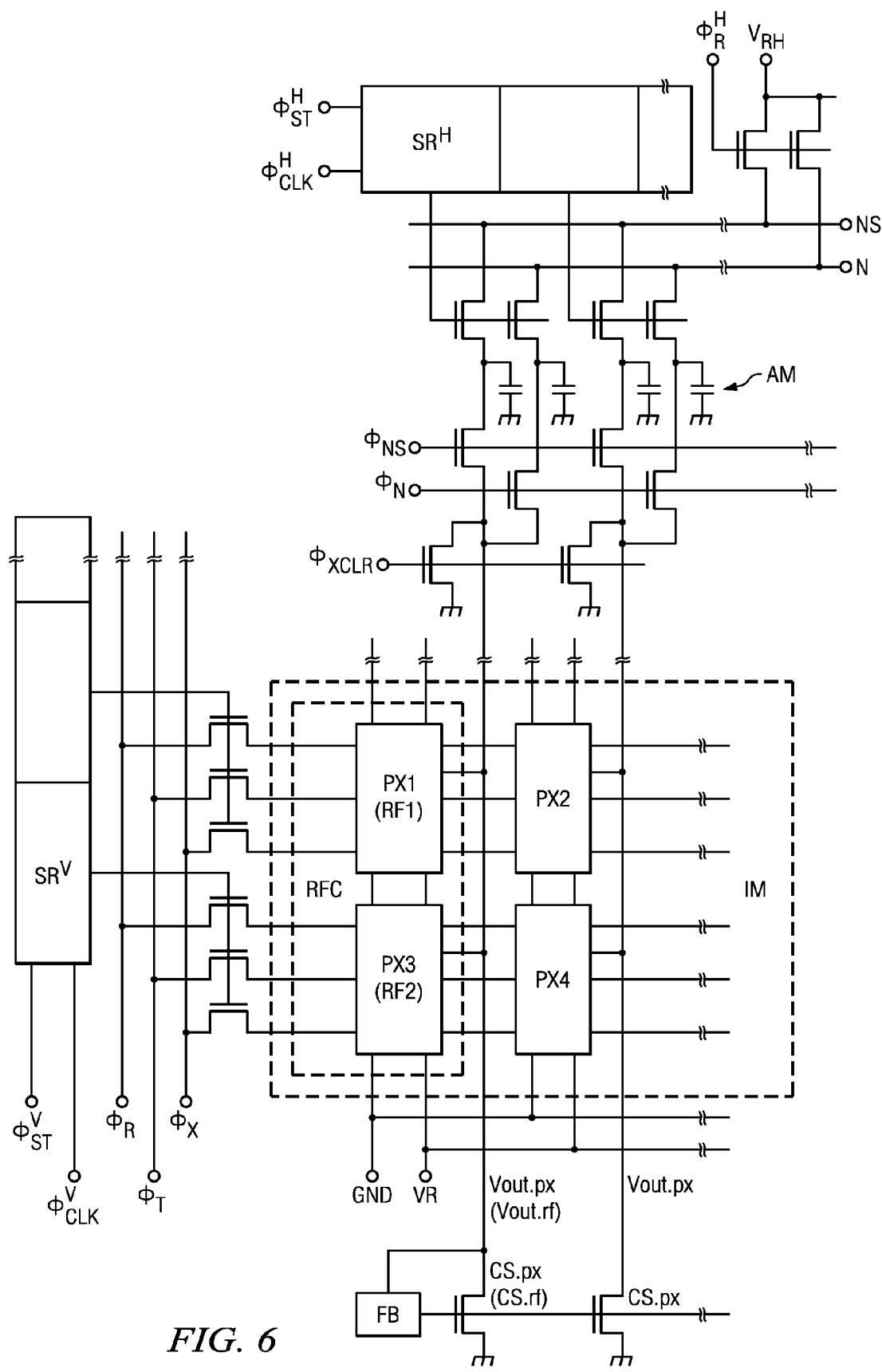
FIG. 6 is a circuit diagram showing the overall circuit configuration of the CMOS image sensor with the configuration shown in FIG. 5.

FIG. 6 is a circuit diagram showing the overall circuit configuration of a CMOS image sensor with the configuration shown in FIG. 5. Some of photosensitive pixels PX that constitute photosensitive surface IM are selected and used as reference pixels (RF1, RF2), which constitute column RFC of reference pixels RF. Photosensitive-surface output lines Vout.px connected to the photosensitive-surface pixels PX used as reference pixels RF are used as reference output lines Vout.rf. The foregoing is nearly the same as the configuration shown in FIG. 4. The figure shows a configuration in which feedback circuit RF is connected to a location in column RFC of reference pixels RF that is farthest from current sources CS.rf, but the configuration could also be such that it is connected to a location between the gate ($\phi$NS, $\phi$N) and analog memory AM in order to send pixel data to analog memory AM. To provide reference data, reference pixels RF supply a noise signal (signal N), or a reference pixel NS signal, and in particular, a saturated signal, for example. Unlike the configuration in FIGS. 3 and 4, that shown in FIGS. 5 and 6 has no dedicated output lines for the reference pixels and the reference output lines, so that the area occupied can be reduced.

Figure 7:
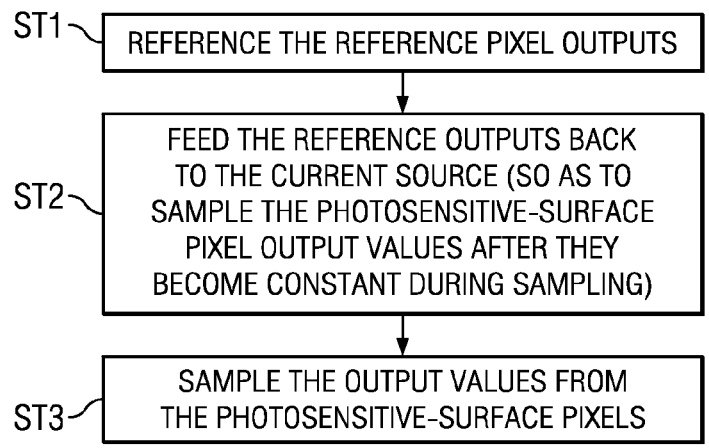
FIG. 7 is a flow chart showing the process for supply current regulation processing in the CMOS image sensor in accordance with a preferred embodiment of the present invention.

FIG. 7 is a flow chart showing the procedure for current source regulation processing in the CMOS image sensor in accordance with a preferred embodiment of the present invention. The solid-state imaging device drive method of the present invention is a drive method for a CMOS image sensor with a configuration in which photosensitive-surface pixels, which are arranged in the form of an array on a photosensitive surface, comprise a photodiode that receives light and generates and stores a photocharge, a transfer transistor that transfers the photocharge from the photodiode, a floating diffusion to which the charge is transferred via the transfer transistor, and an amplifying transistor that converts the photocharge in the floating diffusion into a voltage signal and amplifies the signal, and whose gate electrode is formed connected to the floating diffusion, and in which photosensitive-surface output lines are connected to the photosensitive-surface pixels in the source/drain of each of the amplifying transistors constituting a photosensitive-surface pixel, a current source is formed for the photosensitive-surface output lines, and a sampling circuit that samples the output values of the photosensitive-surface output lines is connected to the photosensitive-surface output lines. The CMOS image sensor, for example, is also constituted to have reference pixels provided outside or inside the photosensitive surface, and reference output lines connected to the reference pixels and the current source regulating part; the reference output from the reference pixels is referenced in a first step ST1. Next, the reference output is fed back to the current source in a second step ST2. That is, when the photosensitive-surface pixel output values are sampled, the current of the current source is regulated so that sampling occurs after it has become constant. Output values of the photosensitive-surface pixels are then sampled in a third step ST3. For current source regulation, usually, current source current can be regulated for each frame, for example. Or current source current could be regulated and fixed prior to imaging of the first frame, and it could remain fixed during the subsequent imaging sequence. Or current could also be regulated for multiple frames.

In the solid-state imaging device drive method of the present invention, the reference pixels and reference output lines could be formed outside the photosensitive surface, but the solid-state imaging device could also be configured so that some of the photosensitive pixels that constitute the photosensitive surface are selected and used as reference pixels, and the photosensitive-surface output lines that are connected to the photosensitive-surface pixels that are used as reference pixels are used as reference output lines.

In the CMOS image sensor in accordance with a preferred embodiment of the present invention, due to the presence of the current source regulating part, when output values are sampled, the sampling circuit can sample output values after the output values have become essentially constant, with comparison immediately after output to the photosensitive surface reference lines, so that sampling before the output values of the pixels have reached a constant value is avoided.

In the CMOS image sensor drive method in accordance with a preferred embodiment of the present invention, when output values are to be sampled, the sampling circuit can sample the output values after the output values have essentially become constant, by comparing the output values immediately after they are output to the photosensitive-surface output lines, so that sampling before the output values of the pixels have reached a constant value is avoided.

Figure 8:
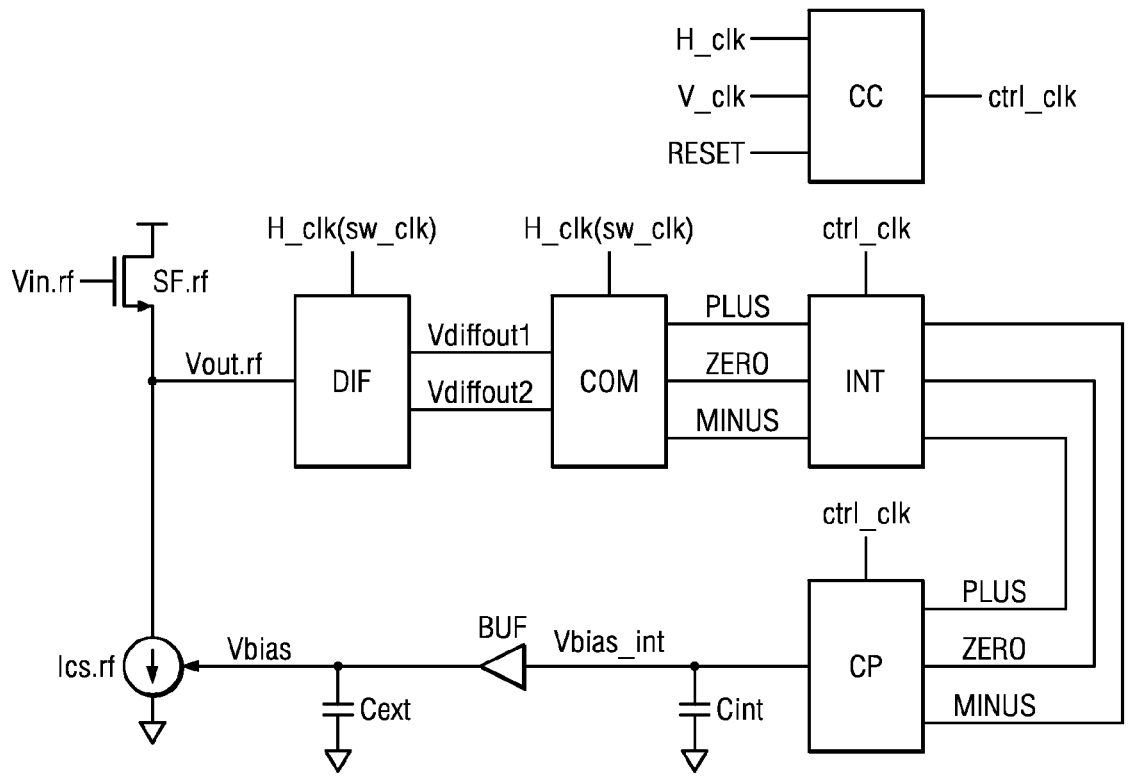
FIG. 8 is a circuit block diagram showing the detailed configuration of the feedback circuit in the CMOS image sensor in accordance with a preferred embodiment of the present invention.

FIG. 8 is a circuit block diagram showing the detailed configuration of the feedback circuit of the CMOS image sensor in accordance with a preferred embodiment of the present invention. The feedback circuit has a difference computing circuit DIF, a comparison circuit COM, an integrating circuit INT, a charge pump circuit CP, a clock control circuit CC, a buffer BUF, an internal capacitor $C_{INT}$, and an external capacitor $C_{EXT}$. The objective for the feedback circuit is for the voltage on reference output lines Vout.rf (hereafter also called output voltage Vout.rf) to stabilize within a predetermined time. "Within a predetermined time" refers to the sampling period. Sampling is performed during the horizontal blanking period, and the sampling period can be set to the maximum value allowed by the horizontal blanking period. The condition for stability refers to output voltage Vout.rf not changing with time below a permissible voltage $\Delta V$, i.e., the voltage variation is determined to have stabilized when equation (3) below is satisfied.

$$|V_{OUT}(t+\Delta t) - V_{OUT}(t)| < \Delta V \quad (3)$$

That is, the difference between the output voltage at time $t+\Delta t$ and the output voltage at time t is calculated, and if it is less than permissible voltage $\Delta V$, output voltage Vout.rf is determined to have stabilized. Difference computing circuit DIF calculates the fluctuation of Vout.rf as it varies. Difference computing circuit DIF outputs the difference between output voltage Vout.rf at two different times, as shown in equations (4a) and (4b) below.

$$V_{DIFFOUT1} = V_{OUT}(t) - V_{OUT}(t+\Delta t) \quad (4a)$$

$$V_{DIFFOUT2} = V_{OUT}(t+\Delta t) - V_{OUT}(t) \quad (4b)$$

Figure 9:
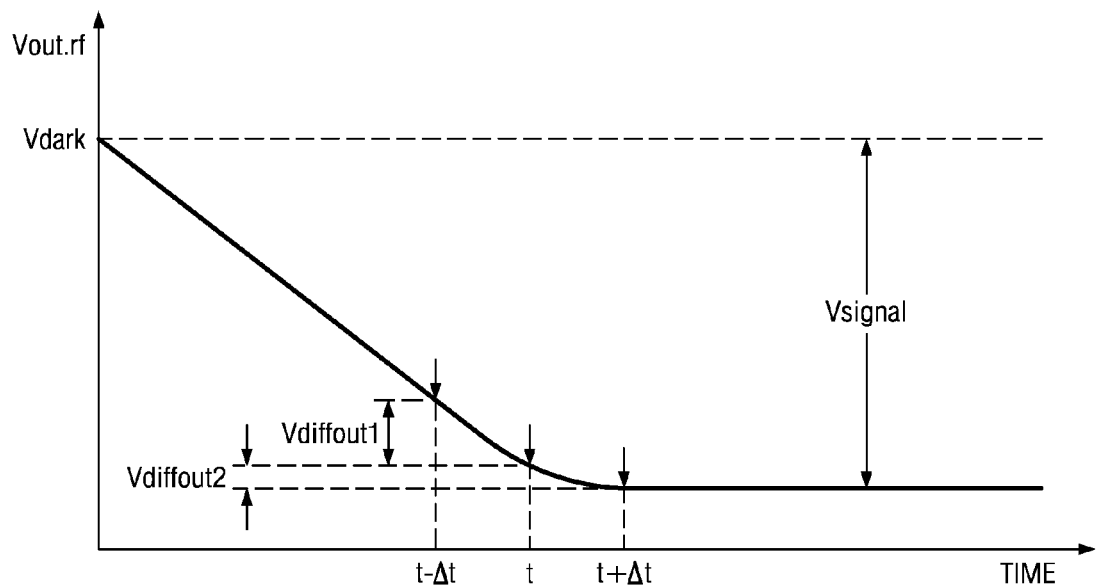
FIG. 9 is a graph showing the temporal change in the output voltage of the reference pixels in the CMOS image sensor in accordance with a preferred embodiment of the present invention.

FIG. 9 is a graph showing the temporal change in output voltage Vout.rf from reference pixels of the CMOS image sensor in accordance with a preferred embodiment of the present invention. As shown in FIG. 9, $V_{DIFFOUT1}$ represented by equation (4a) above is the difference between the output voltage at time t and the output voltage at time $t-\Delta t$. $V_{DIFFOUT2}$ represented by equation (4b) above is the difference between the output voltage at time $t+\Delta t$ and the output voltage at time t. Time t is selected as the actual sampling completion time, and is preferably matched to the timing for the sampling switch to the analog memory to go off, for example. In this configuration, it is necessary to know when time $t-\Delta t$ arrives, and a clock signal to provide notice of a time earlier than time t by $\Delta t$ is necessary. An additional clock could also be provided, but by inputting the sampling clock earlier by $\Delta t$, an additional clock is not required with the circuit configuration shown in FIG. 10.

Figure 10:
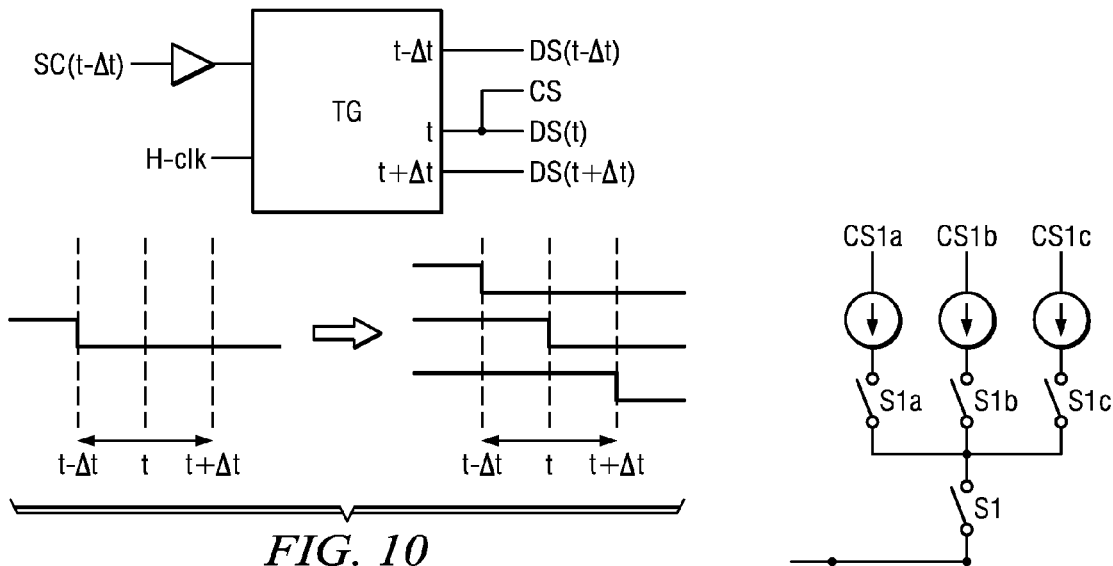
FIG. 10 is a circuit block diagram of a timing generator that generates clock signals in accordance with a preferred embodiment of the present invention.

FIG. 10 is a circuit block diagram of a timing generator TG that generates the clock signals described above. In FIG. 10, when a sampling clock signal ($t-\Delta t$) is input at time $t-\Delta t$ to timing generator TG, sampling clock signal DS ($t-\Delta t$) is output at time $t-\Delta t$ to the difference computing part, sampling clock signal DS (t) is output at time t to the difference computing part, and sampling clock signal DS ($t+\Delta t$) is output at time $t+\Delta t$ to the difference computing part. In addition, at time t, a sampling clock signal CS is also output to the photosensitive-surface pixel columns. The $\Delta t$ generation method is a method that uses a horizontal frequency clock, for example, and can be realized relatively easily. The output ($V_{DIFFOUT1}$, $V_{DIFFOUT2}$) from difference computing circuit DIF is input to comparison circuit COM. The input voltage is compared to the preset comparison voltages ($\Delta V1$, $\Delta V2$), and the results obtained are output to either a positive output line plus, a zero output line zero, or a negative output line minus. That is, comparison circuit COM is a 1.5 bit output comparator. The output from difference computing circuit DIF will be small if the sampling time occurs after the correct time, and will be large if it occurs before the correct time. The optimal value for the selected current is when the current is at time t, as shown in FIG. 9; not between time $[t-\Delta t, t]$ but between time $[t, t+\Delta t]$. Comparison circuit COM compares the outputs ($V_{DIFFOUT1}$, $V_{DIFFOUT2}$) from difference computing circuit DIF with comparison voltages ($\Delta V1$, $\Delta V2$); a pulse is output to either positive output line plus, zero output line zero, or negative output line minus, as shown in Table 1 below.

TABLE 1

| Input ($\Delta V_{DIFFOUT1}$) | Input ($\Delta V_{DIFFOUT2}$) | Output |
|---|---|---|
| $\Delta V_1$ ($V_{DIFFOUT1}$) | $\Delta V_2$ ($V_{DIFFOUT2}$)<br>$\|V_{DIFFOUT2}\| < \Delta V_2$<br>$\|V_{DIFFOUT2}\| < -\Delta V_2$ | Indefinite |
| $\|V_{DIFFOUT1}\| < \Delta V_1$ | $\Delta V_2 < V_{DIFFOUT2}$<br>$\|V_{DIFFOUT2}\| < \Delta V_2$<br>$V_{DIFFOUT2} < -\Delta V_2$ | Output pulse to the plug output line (large current) |
| $V_{DIFFOUT1} < -\Delta V_1$ | $\Delta V_2 < V_{DIFFOUT2}$<br>$\|V_{DIFFOUT2}\| < \Delta V_2$<br>$V_{DIFFOUT2} < -\Delta V_2$ | Indefinite Output pulse to the zero output line (appropriate current) Output pulse to minus output line (small current) |

Comparison circuit COM may operate once per horizontal blanking period, for example. Integration circuit INT calculates the total number of pulses during the control clock (ctrl_clk) period based on the output from comparison circuit COM. The total value is the number of negative output line pulses subtracted from the number of positive output line pulses. If the total value is positive, only one pulse is output to positive output line plus; if zero, to zero output line zero; and if negative, to negative output line minus. The output is synchronized with control clock (ctrl_clk), and the results during the control clock (ctrl_clk) period are smoothed (evened out). For example, when control clock (ctrl_clk) is a one frame cycle, current source current for the next frame can be regulated by averaging the dark outputs (noise signal output) of all columns. After output, the total value is reset to zero. Charge pump circuit CP receives the outputs of integration circuit INT and outputs a current. When a pulse enters the positive input plus, current Icp is sourced for a period $T_{PULSE}$, and when a pulse enters the negative input minus, current Icp is sunk for a period $T_{PULSE}$. Like integration circuit INT, charge pump circuit CP operates synchronously with control clock (ctrl_clk). The number of charge injections or outflows q per unit time is represented by equation (5) below.

$$q = I_{CP} \cdot V_{PULSE} \qquad (5)$$

Figure 11:
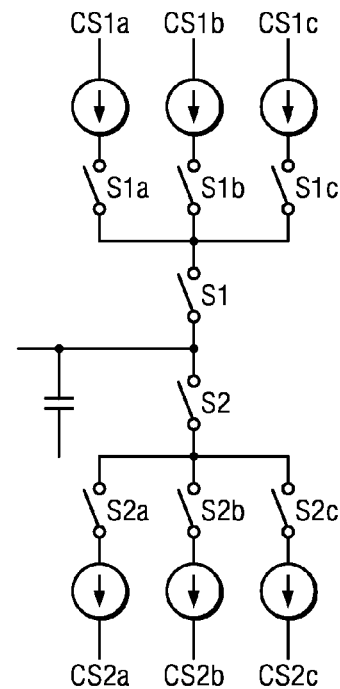
FIG. 11 is a more detailed circuit diagram constituting the charge pump circuit in accordance with a preferred embodiment of the present invention.

FIG. 11 is a more detailed circuit diagram of charge pump circuit CP. Multiple current sources (CS1a-CS1c,CS2a-CS2c) are connected in series and/or in parallel via switches (S1, S2) and switches (S1a-S1c,S2a-S2c). For example, when of charge pump circuit CP increases the output current, switch S1 is turned on, and switches S1a-S1c are successively turned on. When it decreases the output current, switch S2 is turned on, and switches S2a-S2c are successively turned on. The operation of successively switching the switches is performed for each frame, for example. In this case, the output current is regulated for each frame, and it can be regulated to the correct current within multiple frames. Clock control circuit CC determines and outputs the operating frequency (control clock (ctrl_clk)) for integration circuit INT and charge pump circuit CP. More specifically, whether to drive integration circuit INT and charge pump circuit CP with either a clock operating at a horizontal frequency, or a clock operating at a vertical frequency, is selected.

With normal operation, to prevent image defects such as horizontal banding, it is sometimes preferable to control the bias current source with a slow vertical frequency. On the other hand, when the bias current source current value is significantly far from the correct value, such as at startup, it is sometimes preferable to use a fast horizontal frequency. Accordingly, control clock circuit CC detects startup, for example, and selects a horizontal frequency for from one to several frame periods, and then selects a vertical frequency. The numerical values to be determined are compiled in Table 2. The current source current is self-determined, so it does not appear in Table 2. The parameters in the spaces in Table 2 are determined as explained below.

TABLE 2

| Circuit block | Parameter | Value | Explanation |
|---|---|---|---|
| General | Th | 27.6 µs (=362 kHz) | Horizontal operation period |
| Current Source | gm | 100 µA/V | gm of pixel bias current |
|  | Vbias | 1.0 V < 561 | Gate voltage |
| Differentiator | t | 700 ns | Rise of clk |
|  | $\Delta t$ |  | Time for judging as stable |
| Comparator | $\Delta V$ | 1.4 mV | Allowed voltage |
| Integrator | Tpulse | 20 ns | Output pulse duration |
| Charge Pump | Icp | 10 µA | Output current value |
| Cint | Cint | 100 pF | Internal capacity |
| Cext | Cext | 10 µF | External capacity |

First, the startup time is calculated. This is the time required to raise $V_{BIAS}$, which is 0 V initially, to 1.0 V, as shown in Table 2. During initial startup, a horizontal frequency is selected by the clock control part, and the overall circuit operates with a period of TH=27.6 µsec. There is a charge outflow of $I_{CP} \cdot T_{PULSE}$ from the charge pump per period, so that the number of charge pump times n required is represented by equation (6) below.

$$n = \frac{C_{INT} \cdot V_{BIAS}}{I_{CP} \cdot T_{PULSE}} \qquad (6)$$

From Equation (6), startup time $T_{STARTUP}$ is represented by equation (7) below.

$$T_{STARTUP} = n \cdot T_H = \frac{C_{INT} \cdot V_{BIAS}}{I_{CP} \cdot T_{PULSE}} T_H \qquad (7)$$

Voltage $V_{BIAS}$, which controls the bias current source, is digitally controlled, so that quantization errors occur. The adjustable width $\Delta V_{BIAS\_INT}$ of the voltage value at the output node of charge pump circuit CP is represented by equation (8) below.

$$\Delta V_{BIAS\_INT} = \frac{I_{CP} \cdot T_{PULSE}}{C_{INT}} \qquad (8)$$

The error remains even after the voltage passes through 1× buffer BUF and is converted into current by the bias current source. Current value $\Delta I_{CS}$, which has been converted, is represented by equation (9) below.

$$\Delta V_{BIAS\_INT} = g_m \cdot \Delta V_{BIAS\_INT} = \frac{g_m \cdot I_{CP} \cdot T_{PULSE}}{C_{INT}} \qquad (9)$$

The output error can be calculated from the current relation in equation (1) above. Error $\Delta V$out relative to the output in this case is represented by equation (10) below.

$$\Delta V_{OUT} = \frac{\partial V_{OUT}}{\partial I_{CS}} \Delta I_{CS} = \sqrt{\frac{2I}{\mu_n C_{ox} I_{CS}} \cdot \frac{L}{W}} \Delta I_{CS} \quad (10)$$

In Equation (10), because the sampling of the pixel output with correlated double sampling (CDS) was not taken into consideration, the actual error is believed to be smaller than that represented by equation (10). It is thought that the effect of errors manifests as frame displacement. Here, the time required for startup is calculated. In equation (6) above is the number of charge pumps required until the initial stage. Assuming that the time for one frame is used as the target to enter the initial state, with the SVGA format, n is set to approximately 600, the number of vertical pixels. If $C_{INT}$=100 pF, $I_{CP}$=10 μA, $T_{PULSE}$=20 ns, equation (11) below is calculated from equation (6), and n=500 times is obtained.

$$n = \frac{C_{INT} \cdot V_{BIAS}}{I_{CP} \cdot T_{PULSE}} = \frac{100 \text{ pF} \cdot 1 \text{ V}}{10 \text{ μA} \cdot 20 \text{ ns}} = 500 \quad (11)$$

In the case, when $T_{STARTUP}$ is calculated, the following equation (12) will be used, and initialization is completed within one frame period.

$$\begin{aligned} T_{STARTUP} &= n \cdot T_H \quad (12) \\ &= \frac{C_{INT} \cdot V_{BIAS}}{I_{CP} \cdot T_{PULSE}} T_H \\ &= 500 \cdot 27.6 \text{ μs} \\ &= 13.8 \text{ ms} < 1 \text{ frame} \end{aligned}$$

The quantization error produced by the charge pump is calculated from equation (13) below (from equation (9)).

$$\Delta V_{BIAS\_INT} = \frac{g_m \cdot I_{CP} \cdot T_{PULSE}}{C_{INT}} = 0.2 \text{ μA} \quad (13)$$

It is also calculated as in equation (14) below from (equation (10) above).

$$\Delta V_{OUT} = \sqrt{\frac{2I}{\mu_n C_{ox} I_{CS}} \cdot \frac{L}{W}} \Delta I_{CS} = 1.4 \text{ mV} \quad (14)$$

From the values, it is possible to set approximately ΔVout as permissible error ΔV for comparison circuit COM as shown by equation (15) below.

$$\Delta V_{OUT} \approx \Delta V_{IN} \quad (15)$$

The numerical parameters that include the values obtained by the calculation above are compiled in Table 3.

TABLE 3

| Circuit block | Parameter | Value | Explanation |
|---|---|---|---|
| General | Th | 27.6 μs (=362 kHz) | Horizontal operation period |
| Current Source | gm | 100 μA/V | gm of pixel bias current |
| | Vbias | 1.0 V < 561 | Gate voltage |

TABLE 3-continued

| Circuit block | Parameter | Value | Explanation |
|---|---|---|---|
| Differentiator | t | 700 ns | Rise of clk |
| | Δt | | Time for judging as stable |
| Comparator | ΔV | 1.4 mV | Allowed voltage |
| Integrator | Tpulse | 20 ns | Output pulse duration |
| Charge Pump | Icp | 10 μA | Output current value |
| Cint | Cint | 100 pF | Internal capacity |
| Cext | Cext | 10 μF | External capacity |

Figure 12:
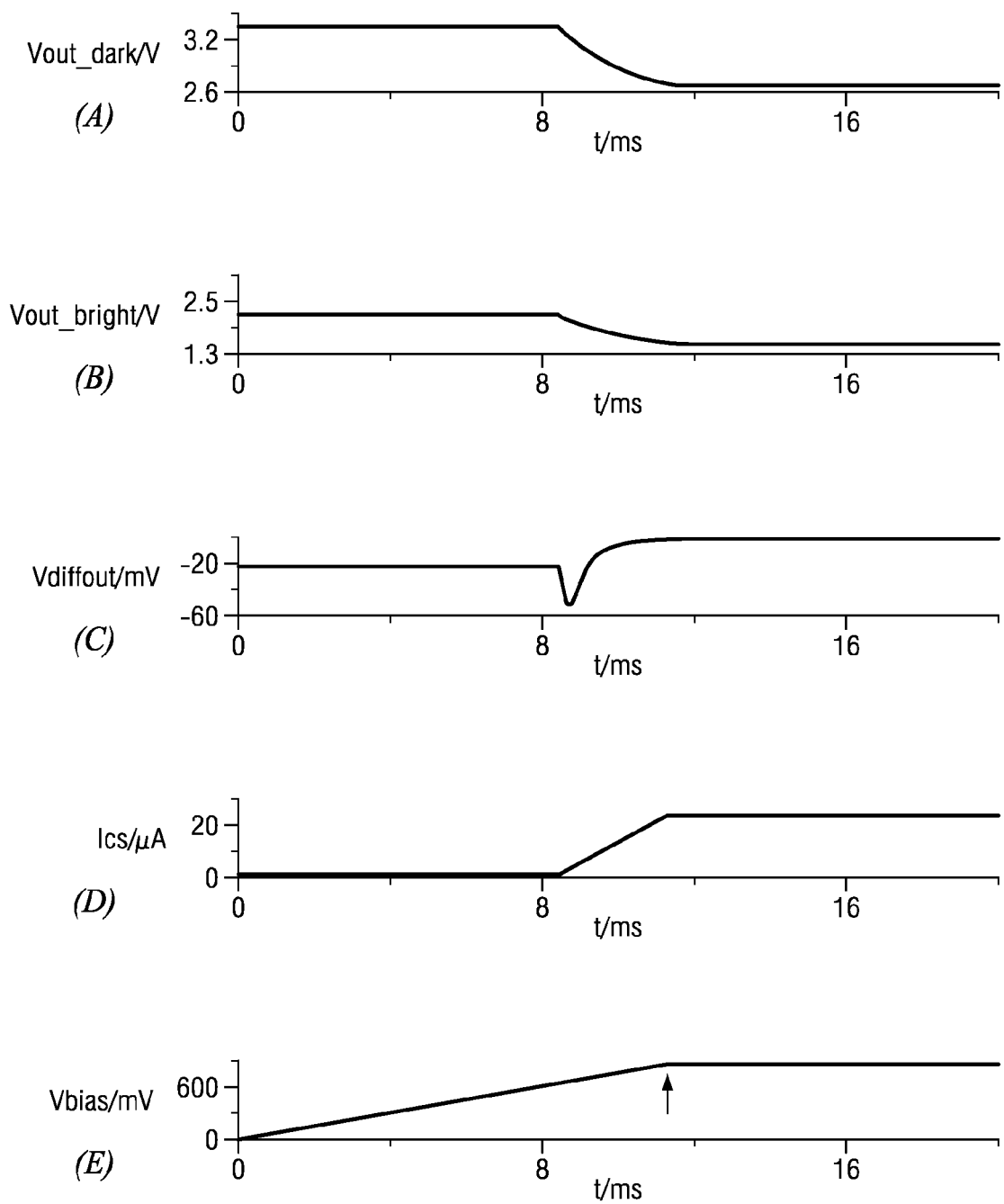
FIG. 12 (A) shows the temporal change in the dark signal, when no light is applied, of the CMOS image sensor in accordance with a preferred embodiment of the present invention.

FIG. 12 (A) shows the temporal change in dark signals (output Vout_dark when dark) when no light is applied. Vref is selected so that Vout_dark=Vref at the point when the current stabilizes.

FIG. 12 (B) shows the temporal change in the bright signal (output Vout_bright when bright) when light is applied. $I_{CS}$ is regulated as described below so that the signal will arrive at the correct time.

FIG. 12 (C) shows the temporal change in $V_{DIFFOUT}$. Although it initially temporarily increases with an increase in current, it eventually decreases.

FIG. 12 (D) shows the temporal change in $I_{CS}$. Assuming it to be 0 A initially, it stabilizes when $V_{DIFFOUT}$=0, so that a small amount of current is supplied. Bias current source $V_{TH}$ is exceeded when $V_{DIFFOUT}$ changes, and current starts to flow for the first time.

FIG. 12 (E) shows the temporal change in $V_{BIAS}$. It gradually rises from zero, and the rise in $V_{BIAS}$ ends as $I_{CS}$ stops, charging, and startup is completed. Next, the dark signal and the bright signal when starting (828 μsec=30 clocks), when current starts to flow (8694 μsec=315 clocks), and when current stabilizes (16,560 μsec=600 clocks) are each measured.

Figure 13:
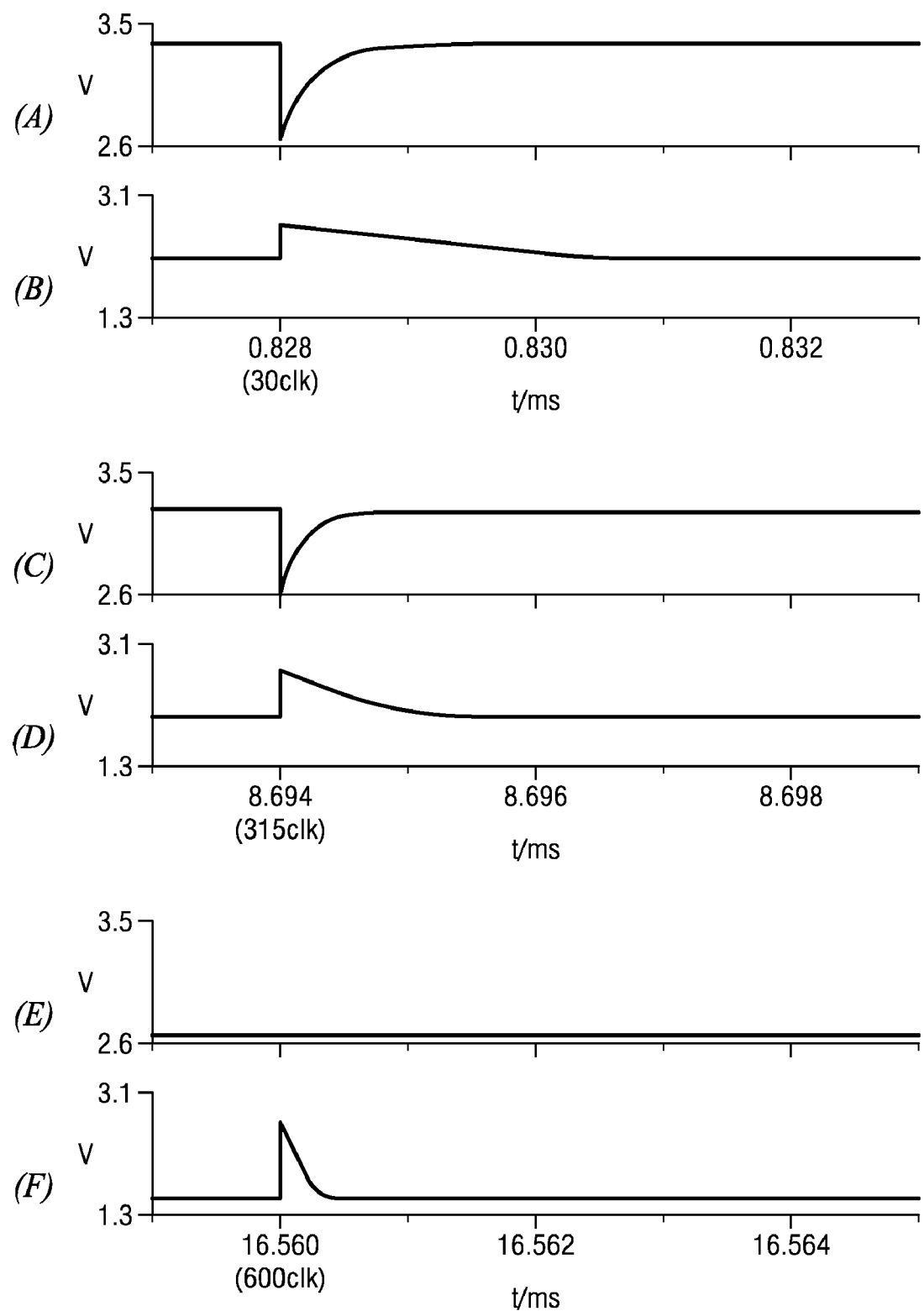
FIGS. 13 (A) and (B) show the dark signal and the bright signal when starting in the CMOS image sensor in accordance with a preferred embodiment of the present invention.

FIGS. 13 (A) and (B) show the dark signal and bright signal when starting (828 μsec=30 clocks), FIGS. 13 (C) and (D) show the dark signal and the bright signal when current starts to flow (8694 μsec=315 clocks), and FIGS. 13 (E) and (F) show the dark signal and the bright signal once the current stabilizes (16,560 μsec=600 clocks). In FIGS. 13 (A)-(D), the bias current value has not yet stabilized, and in contrast, in FIGS. 13 (E) and (F), it can be seen that the signal has stabilized at the sampling time. In this case, no fluctuation appears in the dark signal voltage. This is because Vref, which is equal to the output level when dark, has been selected. With the CMOS image sensor in accordance with a preferred embodiment of the present invention, due to the presence of the current source regulating part, when the output values are sampled, the sampling circuit can sample output values after the output values have essentially become constant immediately after output to the photosensitive-surface output lines, and sampling before the output values have reached a constant value can be avoided.

Figure 14:
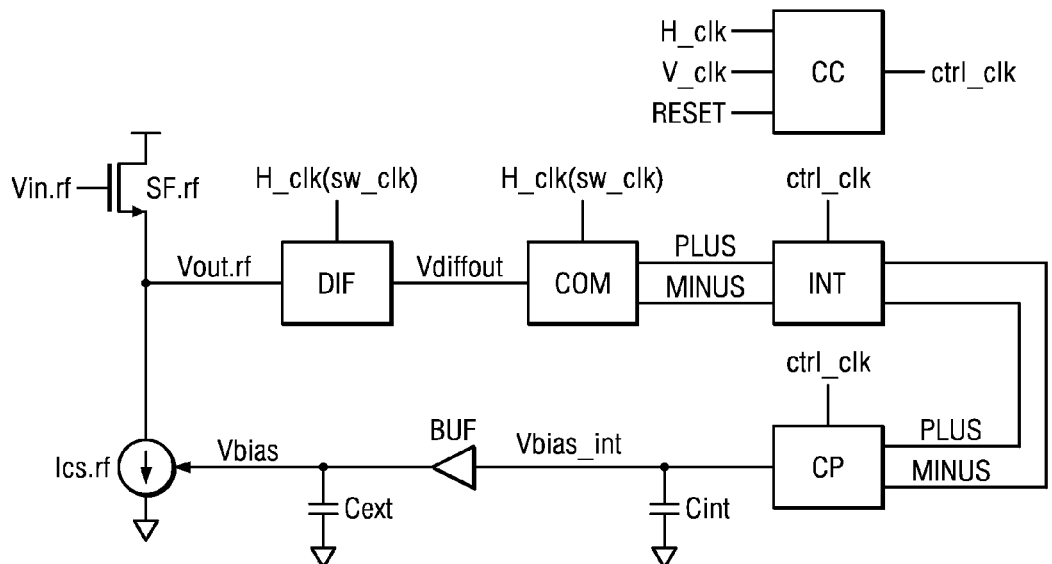
FIG. 14 is a circuit block diagram showing the detailed configuration of the feedback circuit in the CMOS image sensor in accordance with a preferred embodiment of the present invention.

FIG. 14 is a circuit block diagram showing the detailed configuration of the feedback circuit of the CMOS image sensor in accordance with a preferred embodiment of the present invention. In the feedback circuit in accordance with a preferred embodiment of the present invention, the 0 output of comparison circuit COM is 1 bit. That is, $V_{DIFFOUT}$ output from difference computing circuit DIF is input to comparison circuit COM and is output to either positive output line plus or negative output line minus. Integration circuit INT outputs only one pulse to either positive output line plus or negative output line minus, based on the output from comparison circuit COM. Comparison circuit COM in accordance with a preferred embodiment of the present invention compares the input voltage with a comparison voltage and determines only whether it is larger or smaller. This circuit is effective when permissible voltage ΔV in equation (3) cannot be set accurately. This is because to determine stability, comparison circuit COM judges whether a given value is smaller than ΔV, which depends significantly on the precision of ΔV. In Table 3 above, ΔV has a magnitude of around 0.1 mV. With a 1.5 bit comparison part, when the voltage is in the range of a permissible error of ±ΔV, the current only changes within these limits, so that the current will have a fixed current magnitude that varies only slightly. With the 1 bit comparison circuit in accordance with a preferred embodiment of the present invention, a determination will always be performed, which will ultimately converge at a certain current amount.

Figure 15:
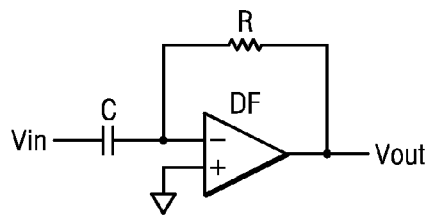
FIG. 15 is a circuit diagram of the differentiating circuit in accordance with a preferred embodiment of the present invention.

FIG. 15 is a circuit diagram of the differentiating circuit. It is configured so that a resistor R and a capacitor C are connected to up amp DF, and output $V_{OUT}$ is represented in terms of the input voltage $V_{IN}$ by equation (16) below.

$$V_{OUT} = -RC\frac{\partial V_{IN}}{\partial t} \tag{16}$$

Input $V_{IN}$ is connected to an analog memory, and therefore $V_{OUT}$ will have a gain of "−RC" multiplied by the time variation in the analog memory. To estimate the numerical value, when $dV_{IN}/dt=1$ mV/100 nsec in a stable state, with C=1 pF, R=1 kΩ, the permissible voltage will be roughly 10 µV. This value is too small, so that comparing the signal with the comparison circuit is very difficult. To increase the gain, only "−RC" can be increased, but making capacitor C larger violates the design of the analog memory, so that resistor R must be made larger; making it 1 MΩ, for example, is conceivable.

Figure 16:
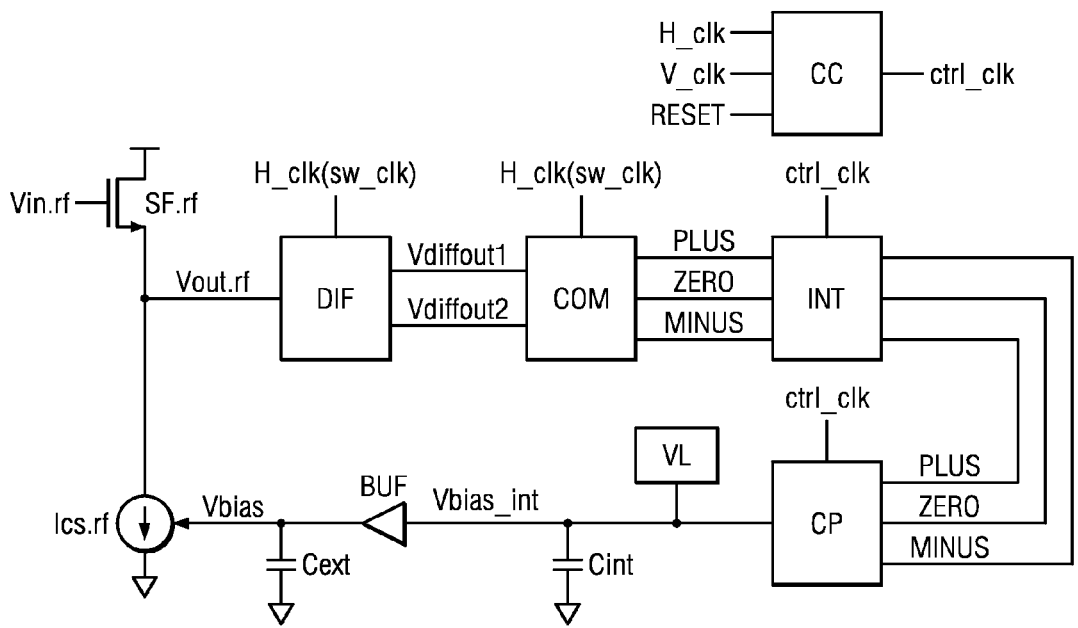
FIG. 16 is a circuit block diagram showing the detailed configuration of the feedback circuit in the CMOS image sensor in accordance with a preferred embodiment of the present invention.

FIG. 16 is a circuit block diagram showing the detailed configuration of the feedback circuit in the CMOS image sensor in accordance with a preferred embodiment of the present invention. In the feedback circuit in accordance with a preferred embodiment of the present invention, a voltage limiter VL is provided at the output node of charge pump circuit CP. When $V_{BIAS\_INT}$ voltage rises or falls too much, the output current of the photosensitive-surface pixels also become larger or smaller accordingly. Thus, voltage limiter VL is provided to prevent $V_{BIAS\_INT}$ voltage from rising or falling excessively. The startup time can also be shortened when initial voltage $V_{BIAS\_INT}$ is applied to voltage limiter VL when the power is turned on.

Figure 17:
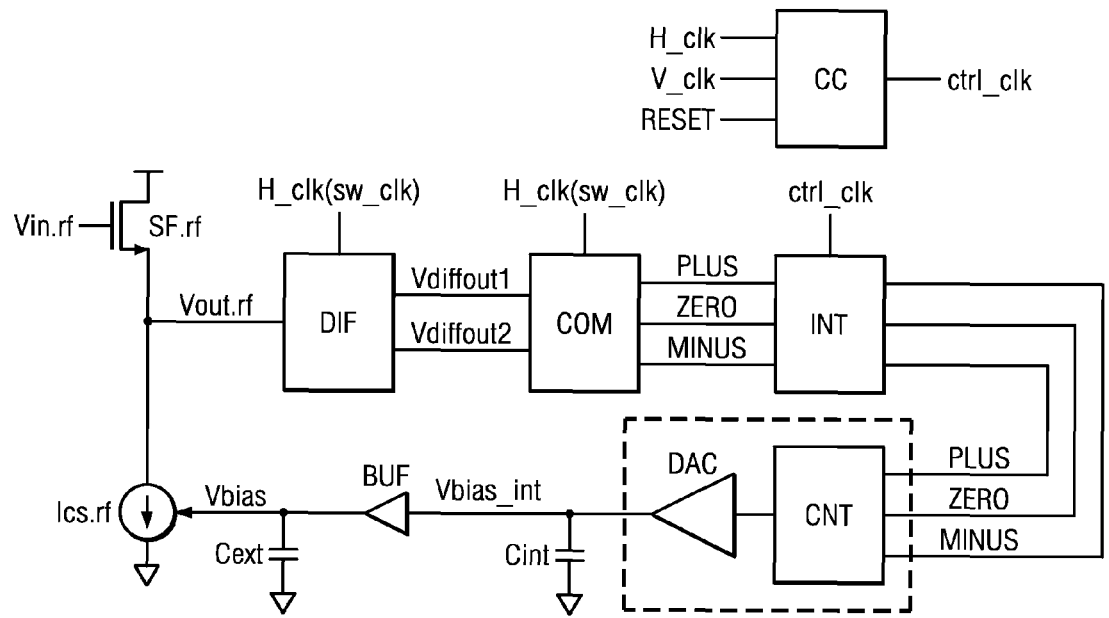
FIG. 17 is a circuit block diagram showing the detailed configuration of the feedback circuit in the CMOS image sensor in accordance with a preferred embodiment of the present invention.
Figure 18:
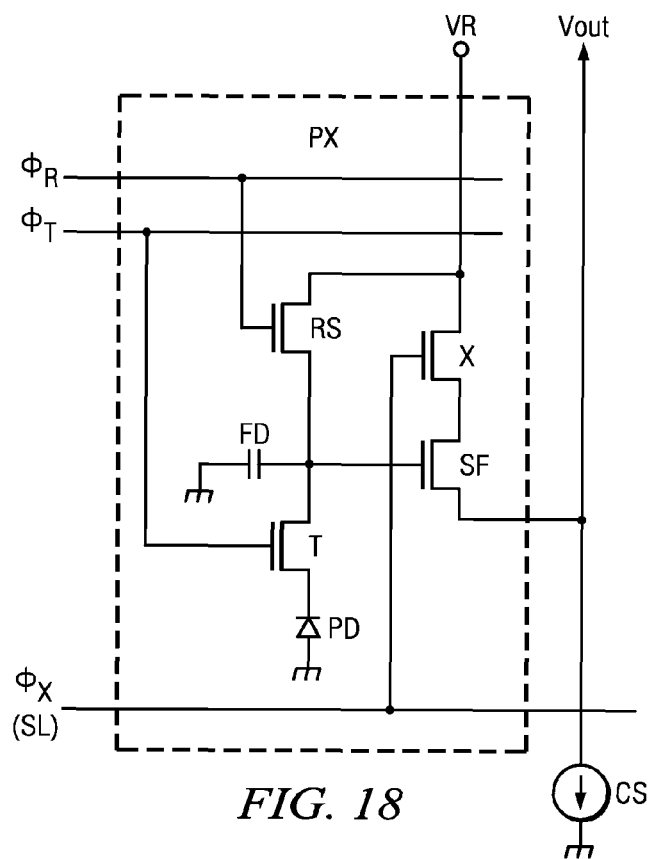
FIG. 18 is a circuit diagram of one picture element (pixel) PX constituting a CMOS image sensor pertaining to a conventional example.
Figure 19:
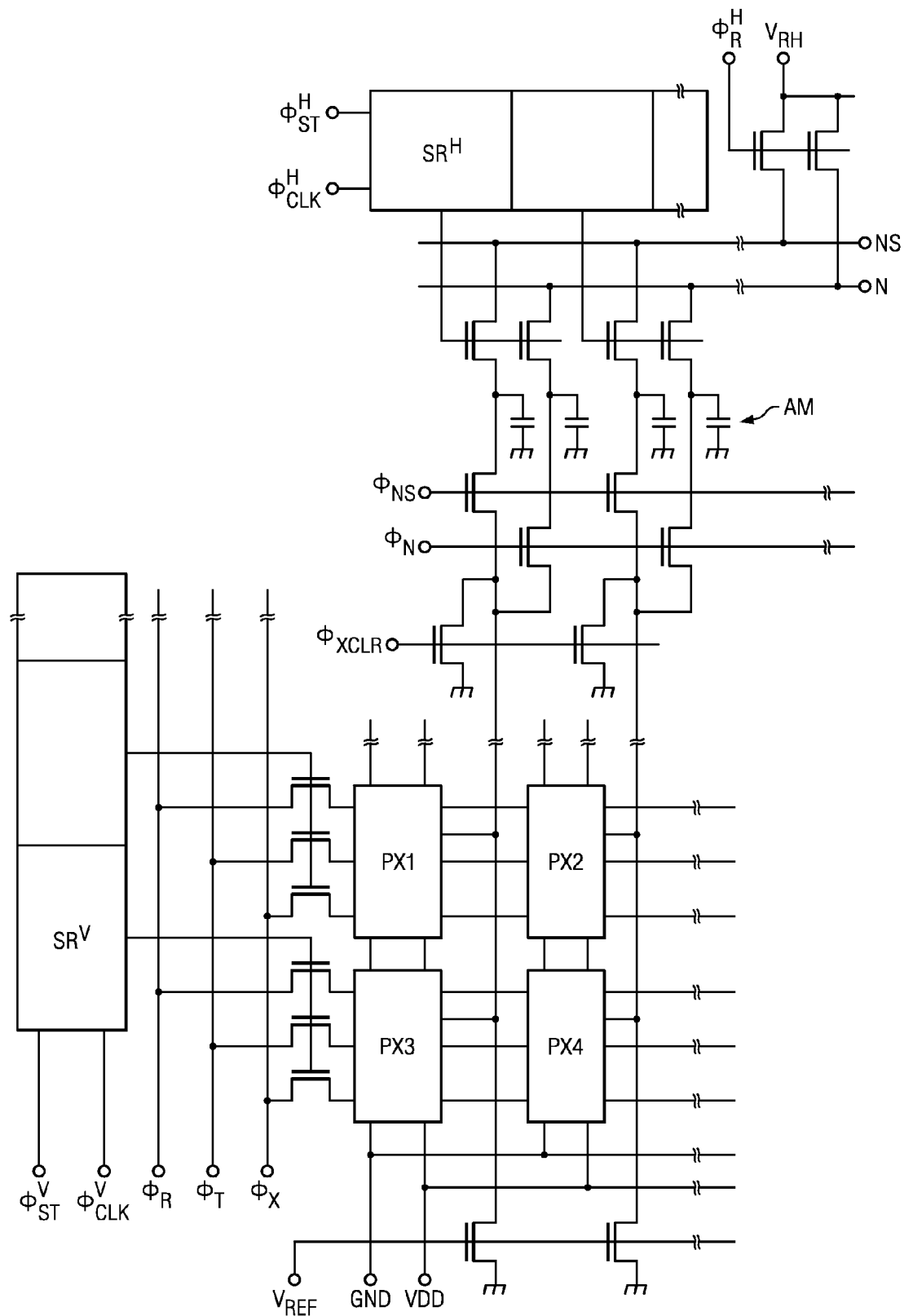
FIG. 19 is a circuit diagram showing the overall circuit configuration of a CMOS image sensor pertaining to a conventional example.
Figure 20:
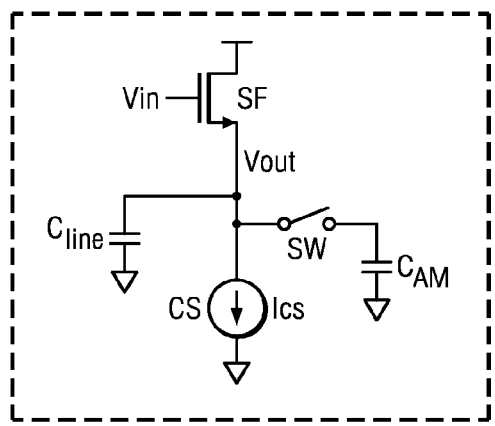
FIG. 20 is a circuit diagram analogous to the output portion from each pixel of a CMOS image sensor pertaining to a conventional example.
Figure 21:
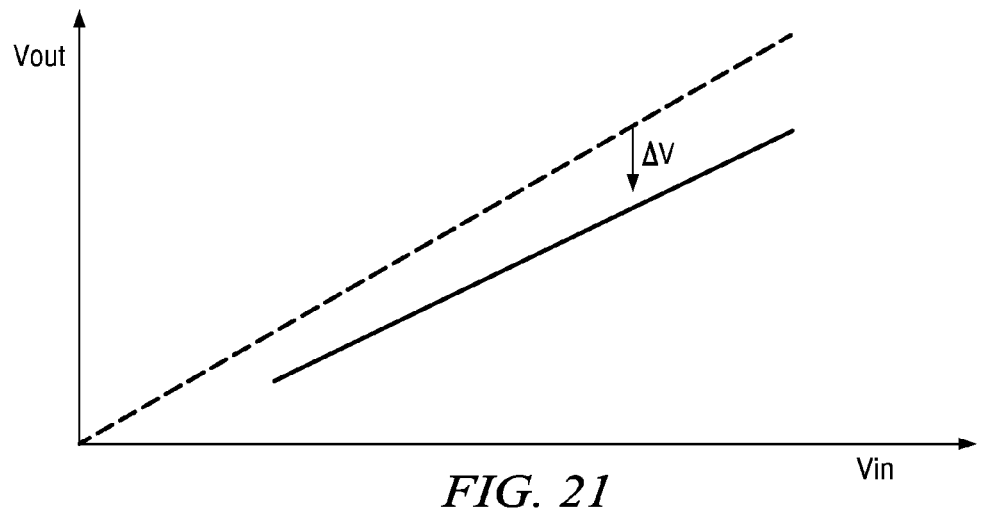
FIG. 21 is a graph showing the output voltage to the output lines relative to input voltage in a CMOS image sensor pertaining to a conventional example.
Figure 22:
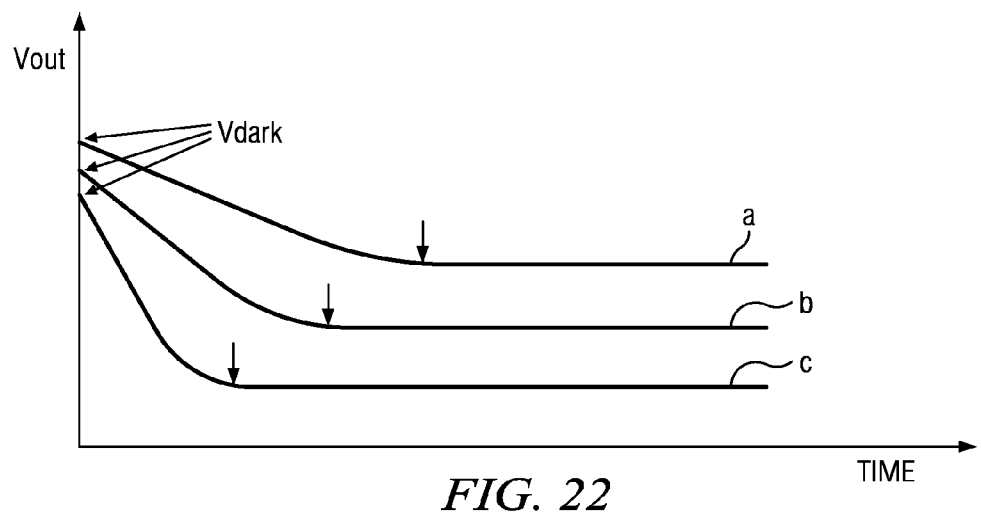
FIG. 22 is a graph showing the time change in output voltage on the output lines in a CMOS image sensor pertaining to the present invention.

FIG. 17 is a circuit block diagram showing the detailed configuration of the feedback circuit of the CMOS image sensor in accordance with a preferred embodiment of the present invention. In the feedback circuit in accordance with a preferred embodiment of the present invention, instead of a charge pump part, a counter CNT and a digital/analog converter DAC are used. Based on the output result from integration circuit INT, pulses are counted by counter CNT, and the count is output to digital/analog converter DAC. In accordance with a preferred embodiment of the present invention, signals downstream of counter CNT are handled as digital signals. In a conventional solid-state imaging device, the photocurrent value can be determined automatically from the temporal change in the output voltage of the pixels. However, if the current value is small, the output is delayed, and if the current value is large, there is a trade-off between a drop in the maximum output and an increase in power consumption. On the other hand, with the solid-state imaging device of the present invention, the optimal current value can be automatically determined even despite the trade-off. Because the present invention does not depend on pixel models, even taking into account pixel structure changes in the solid-state imaging device design stage, new photocurrent values can be found for the new pixel models. While optimal current values would have been found experimentally in the prior art, with the present invention, this is unnecessary, and in contrast to the conventional development process in which optimized current values would have been determined during the design, verification and redesign processes, with the present invention, these values can be determined in a single design cycle. Normally, process variation is considered, and current values are designed to make tolerance somewhat larger, but with the present invention, optimal values are obtained automatically by the circuitry, so that rational design is possible.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus comprising:
    a plurality of current sources;
    an array of photosensitive pixels having a plurality of rows and a plurality of columns, wherein each column is associated with at least one current source such that each pixel within each column is coupled to its associated current source, and wherein at least one column operates as a reference column; and
    a feedback circuit that is coupled to each pixel within the reference column and its associated current source so as to measure a reference current and that is coupled each of the remaining current sources so as to adjust each of the remaining current sources in response to the reference current by providing a bias voltage to each of the remaining current sources.

2. The apparatus of claim 1, wherein the feedback circuit further comprises:
    a differentiator that is coupled to each pixel within the reference column and its associated current source;
    a comparator that is coupled to the differentiator;
    an integrator that is coupled to the comparator; and
    a charge pump that is coupled between the integrator and each of the remaining current sources.

3. The apparatus of claim 2, wherein the feedback circuit further comprises:
    an internal capacitor that is coupled to the charge pump; and
    a buffer that is coupled between the charge pump.

4. The apparatus of claim 3, wherein the feedback circuit further comprises a clock controller that is coupled to each of the integrator and the charge pump.

5. The apparatus of claim 4, wherein the charge pump further comprises:
    a counter that is coupled to the integrator; and
    a digital-to-analog converter (DAC) that is coupled to the counter.

6. The apparatus of claim 4, wherein the feedback circuit further comprises a voltage limiter that is coupled to the charge pump.

7. The apparatus of claim 4, wherein each pixel further comprises:
    a photodiode;
    a transfer transistor that is coupled to the photodiode;

a floating diffusion region that is coupled to the transfer transistor;
a source-follower that is coupled to the floating diffusion region and its associated current source; and
a selection transistor that is coupled to the source-follower.

8. An apparatus comprising:
a first set of pixels;
a second set of pixels;
a first current source that is coupled to each pixel in the first set of pixels;
a second current source that is coupled to each pixel in the second set of pixels; and
a feedback circuit that is coupled to the first current source and each pixel in the first set of pixels so as to measures a reference current and that is coupled to the second current source so as to adjust the second current source in response to the reference current by providing a bias voltage to the second current source.

9. The apparatus of claim 8, wherein each pixel from the first and second sets of pixels further comprises:
a photodiode;
a transfer transistor that is coupled to the photodiode;
a floating diffusion region that is coupled to the transfer transistor;
a source-follower that is coupled to the floating diffusion region and its associated current source; and
a selection transistor that is coupled to the source-follower.

10. The apparatus of claim 8, wherein the feedback circuit further comprises:
a differentiator that is coupled to each pixel within the first set of pixels and the first current source;
a comparator that is coupled to the differentiator;
an integrator that is coupled to the comparator; and
a charge pump that is coupled between the integrator and the second current source.

11. The apparatus of claim 10, wherein the feedback circuit further comprises:
an internal capacitor that is coupled to the charge pump; and
a buffer that is coupled between the charge pump.

12. The apparatus of claim 11, wherein the feedback circuit further comprises a clock controller that is coupled to each of the integrator and the charge pump.

13. The apparatus of claim 12, wherein the charge pump further comprises:
a counter that is coupled to the integrator; and
a digital-to-analog converter (DAC) that is coupled to the counter.

14. The apparatus of claim 12, wherein the feedback circuit further comprises a voltage limiter that is coupled to the charge pump.

15. An apparatus comprising:
row shift register circuitry;
column shift register circuit;
a reference column of pixels, wherein each pixel from the reference column is coupled to the row shift register circuitry and the column shift register circuitry;
an imaging array of pixels having a plurality of rows and a plurality of columns, wherein each pixel is coupled to the row shift register circuitry and the column shift register circuitry;
a reference current source that is coupled to each pixel in the reference column;
a plurality of imaging current sources, wherein each column of the imaging array is associated with at least one imaging current source such that each pixel within each column of the imaging array is coupled to its associated imaging current source; and
a feedback circuit having:
a differentiator that is coupled to each pixel within the reference column and the reference current source;
a comparator that is coupled to the differentiator;
an integrator that is coupled to the comparator; and
a charge pump that is coupled between the integrator and each imaging current sources.

16. The apparatus of claim 15, wherein the feedback circuit further comprises:
an internal capacitor that is coupled to the charge pump;
a buffer that is coupled between the charge pump; and
a clock controller that is coupled to each of the integrator and the charge pump.

17. The apparatus of claim 16, wherein the charge pump further comprises:
a counter that is coupled to the integrator; and
a digital-to-analog converter (DAC) that is coupled to the counter.

18. The apparatus of claim 16, wherein the feedback circuit further comprises a voltage limiter that is coupled to the charge pump.

19. The apparatus of claim 16, wherein each pixel further comprises:
a photodiode;
a transfer transistor that is coupled to the photodiode;
a floating diffusion region that is coupled to the transfer transistor;
a source-follower that is coupled to the floating diffusion region and its associated current source; and
a selection transistor that is coupled to the source-follower.

* * * * *